(12) United States Patent
Wang et al.

(10) Patent No.: US 9,586,818 B2
(45) Date of Patent: Mar. 7, 2017

(54) STEAM TO CARBON RATIO CONTROL DEVICE

(71) Applicant: ALLY HI-TECH CO., LTD, Sichuan (CN)

(72) Inventors: Yeqin Wang, Chengdu (CN); Wei Zhang, Chengdu (CN)

(73) Assignee: ALLY HI-TECH CO., LTD, Chengdu (CN)

( * ) Notice: Subject to any disclaimer, the term of this patent is extended or adjusted under 35 U.S.C. 154(b) by 109 days.

(21) Appl. No.: 14/404,475

(22) PCT Filed: Aug. 16, 2013

(86) PCT No.: PCT/CN2013/081654
§ 371 (c)(1),
(2) Date: Nov. 28, 2014

(87) PCT Pub. No.: WO2015/018105
PCT Pub. Date: Feb. 12, 2015

(65) Prior Publication Data
US 2016/0096730 A1    Apr. 7, 2016

(30) Foreign Application Priority Data

Aug. 5, 2013   (CN) .......................... 2013 1 0335566

(51) Int. Cl.
*C01B 3/34*      (2006.01)
*B01B 1/00*      (2006.01)
(Continued)

(52) U.S. Cl.
CPC .............. *C01B 3/34* (2013.01); *B01B 1/005* (2013.01); *B01D 1/0082* (2013.01); *B01J 19/0006* (2013.01); *B01J 19/2425* (2013.01); *B01J 2219/00054* (2013.01); *B01J 2219/00058* (2013.01); *B01J 2219/00063* (2013.01); *B01J 2219/00162* (2013.01);
(Continued)

(58) Field of Classification Search
CPC .............................. C01B 3/34; B01J 19/0006
See application file for complete search history.

(56) References Cited

U.S. PATENT DOCUMENTS 4,022,593 A * 5/1977 Lerner ................... B01D 53/18
                                                                    55/424
4,705,654 A * 11/1987 Niwa .................. B01F 3/04078
                                                                    165/159
(Continued)

*Primary Examiner* — Matthew Merkling

(57) ABSTRACT

The present invention relates to a steam to carbon ratio control device including: a heat source, and an evaporation mixer and a steam separator interconnected by pipelines, said connecting pipelines of the evaporation mixer and the steam separator are provided with a temperature control device and a pressure control device, said evaporation mixer is provided with a natural gas inlet, a desalinated water inlet and a mixed gas outlet, the inlet of said heat source is connected with a end closer to the natural gas inlet of the evaporation mixer, the outlet of said heat source is connected to a end closer to the mixed gas outlet. Comparing with the prior art, the beneficial effect of the present invention is that it can accurately control the proportion of natural gas to steam and stably control the flow rates of natural gas and steam.

9 Claims, 2 Drawing Sheets

(51) Int. Cl.
*B01D 1/00* (2006.01)
*B01J 19/00* (2006.01)
*B01J 19/24* (2006.01)

(52) U.S. Cl.
CPC ......... *B01J 2219/00182* (2013.01); *B01J 2219/00202* (2013.01); *B01J 2219/00213* (2013.01); *B01J 2219/00231* (2013.01); *B01J 2219/00238* (2013.01); *C01B 2203/0233* (2013.01); *C01B 2203/169* (2013.01); *Y02P 20/129* (2015.11)

(56) References Cited

U.S. PATENT DOCUMENTS

| | | | | |
|---|---|---|---|---|
| 4,940,828 | A * | 7/1990 | Petterson | C10G 9/20 585/648 |
| 6,723,888 | B2 * | 4/2004 | Roggeman | B01F 3/04078 585/3 |
| 7,066,973 | B1 * | 6/2006 | Bentley | B01J 8/0465 422/198 |
| 7,481,859 | B2 * | 1/2009 | Rostrup-Nielsen | B01J 8/0285 422/200 |
| 2006/0204412 | A1 * | 9/2006 | Rizzo | B01B 1/005 422/198 |

* cited by examiner

STEAM TO CARBON RATIO CONTROL DEVICE

FIELD OF THE TECHNOLOGY

The present invention relates to a steam to carbon ratio control device.

BACKGROUND

In the fields of using natural gas and steam as raw materials to produce hydrogen gas, methanol, syngas and synthetic ammonia, and in the various technologies, stringent control on the proportions of these two raw gases, i.e. the steam to carbon ratio (mainly the total number of carbon atoms and volume flow of steam), is required. As the main composition of natural gas is methane, the steam to carbon ratio in the above technologies refers to: the ratio of volume of methane to volume of steam under the same temperature, pressure and operation conditions.

Steam to carbon ratio is generally calculated from the average carbon molecular numbers of raw materials in a device. When the raw materials change greatly, the lack of calibration leads to inaccuracy. The steam to carbon ratio is the most sensitive technical parameter in light oil reforming process. A rise in steam to carbon ratio can reduce coking of catalyst and effective surface area of conversion catalyst and decrease the reaction activity and efficiency, and decrease C2 or higher hydrocarbon content at the bed outlet, all of which are very beneficial to the reformation reaction. However, the rise in steam to carbon ratio correspondingly increases consumption of desalinated water and reformer energy, and increases load of the downstream cooling system. Therefore, a suitable steam to carbon ratio can only be determined according to a specific industrial device.

However, in the present technologies of applying natural gas for hydrogen, methanol, syngas and synthetic ammonia production, only a flow rate control system is provided on pipelines of the two raw gases for controlling steam to carbon ratio. Realization of such steam to carbon ratio control technology completely relies on the linkage between adjusting valves and flowmeters. Since response time of the adjusting valves towards signals produces different levels of delay or lagging and flowmeters for measuring flow rate inherently have measurement errors, accurate flow rate control is unable to be realized and the flow rate always fluctuates within a certain range. Such would unavoidably result in the inability of the adjusting valve to timely adjust the flow rate, and in turn fail to achieve accurate and stable control on steam to carbon ratio. In addition, different flowmeters have high demands towards installation positions.

SUMMARY

The invention disclosed a steam to carbon ratio control device which can overcome shortcomings of the prior art. The invention can accurately control the proportion of natural gas to steam and stably control the flow rates of natural gas and steam.

The technical proposal of the invention is realized like this: A steam to carbon ratio control device, it comprises: a heat source, and an evaporation mixer and a steam separator interconnected by pipelines, said connecting pipelines of the evaporation mixer and the steam separator are provided with a temperature control device and a pressure control device, said evaporation mixer is provided with a natural gas inlet, a desalinated water inlet and a mixed gas outlet, said heat source inlet is connected with a end closer to the natural gas inlet of the evaporation mixer, said heat source outlet is connected to a end closer to the mixed gas outlet of the evaporation mixer, said heat source inlet is connected with a first flow rate adjusting valve, said first flow rate adjusting valve and the temperature control device are connected with electronic control, said natural gas inlet is connected with a second flow rate adjusting valve, said second flow rate adjusting valve and the pressure control device are connected with electronic control.

Further, a liquid level control device is provided on said evaporation mixer, and a third flow rate adjusting valve is provided on the desalinated water inlet, wherein the liquid level control device and the third flow rate adjusting valve are interconnected with electronic control.

Further, said liquid level control device is provided on an outside of the evaporation mixer.

Further, there is a plurality of inner pipes inside said evaporation mixer.

Further, a steam separating inlet and a steam separating outlet are provided on said steam separator.

Further, a skimmer is provided inside said steam separator.

Further, said liquid level control device (13) is a level gauge, and said pressure control device (4) is a liquidometer.

Further, said temperature control device and the pressure control device both are located at one end near the mixed gas outlet.

Further, said heat source is a saturated steam, process gas, intermediate air or reformed gas.

Comparing with the prior art, the beneficial effect of the present invention is that it can accurately control the proportion of natural gas to steam and stably control the flow rates of natural gas and steam.

BRIEF DESCRIPTION OF THE DRAWINGS

In order to more clearly illustrate the prior art embodiment or aspect of embodiments of the present invention, embodiments will be described in the following figures for the embodiment of the need to use simple introduction, it is obvious, the following description of the drawings are Some embodiments of the present invention, the person of ordinary skill in the art, in the premise without creative efforts can also obtain other drawings according to these drawings.

In the figure, 1—Evaporation mixer; 2—Steam separator; 3—Temperature control device; 4—Pressure control device; 5—Natural gas inlet; 6—Desalinated water inlet; 7—Mixed gas outlet; 8—Inner pipe; 9—Heat source inlet; 10—Heat source outlet; 11—A first flow rate adjusting valve; 12—A second flow rate adjusting valve; 13—Liquid level control device; 14—A third flow rate adjusting valve; 15—Steam separating inlet; 16—Steam separating outlet; 17—Skimmer.

DETAILED DESCRIPTION

In the following examples with specific technical solution of the present invention will be clearly and fully described, obviously, the described embodiments are only part of the embodiments of the present invention, but not all embodiments. Based on the embodiment of the present invention, persons of ordinary skill in the art without creative work under the premise that all other embodiments obtained, all belong to the protection scope of the present invention.

Figure 1:
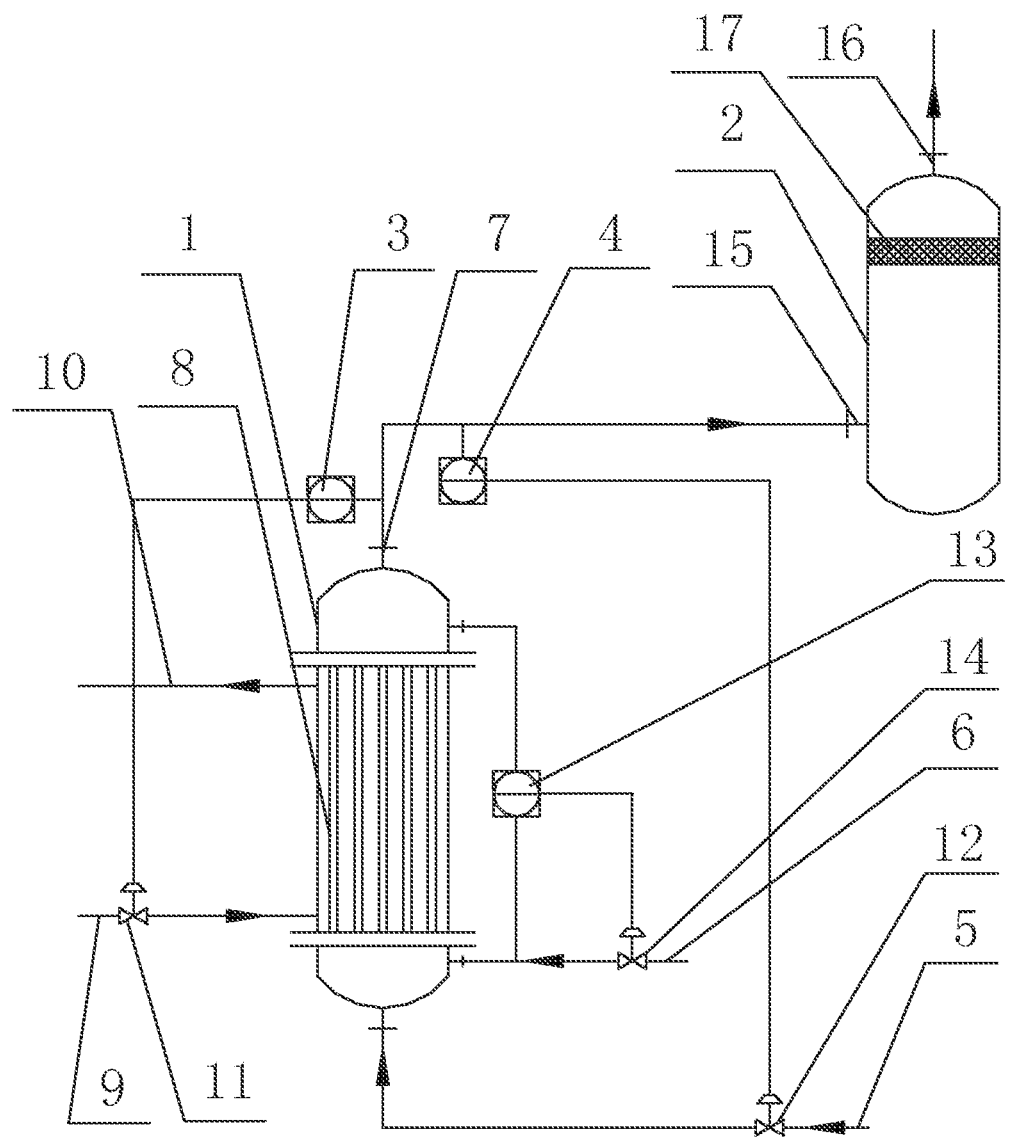
FIG. 1 is a schematic diagram of an embodiment of the present invention.
Figure 2:
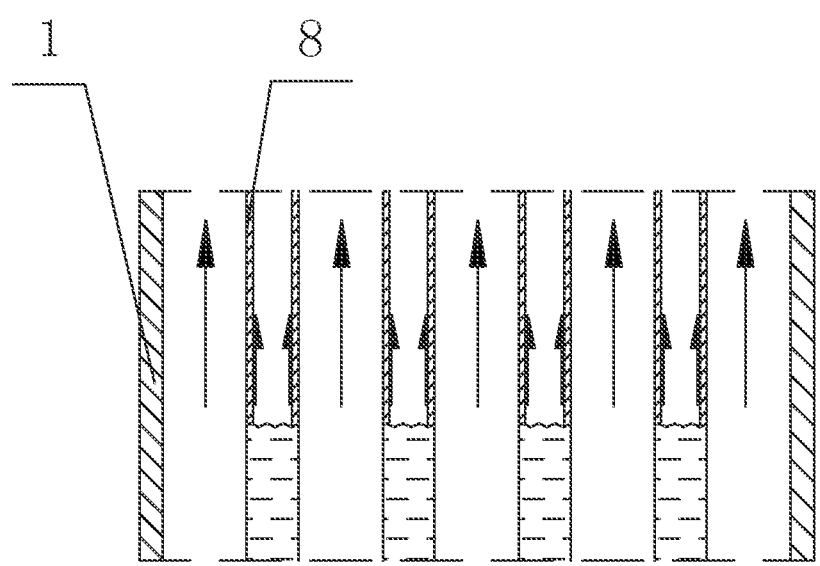
FIG. 2 is a schematic diagram illustrating the steam to carbon ratio control principle inside the evaporation mixer of the present invention.

As shown in FIGS. 1 and 2, the steam to carbon ratio control device includes a heat source, and an evaporation mixer 1 and a steam separator 2 interconnected by pipelines, said heat source can be a saturated steam, process gas, intermediate air or reformed gas, in this embodiment, the heat source is a saturated steam, said connecting pipelines of said evaporation mixer 1 and steam separator 2 are provided with a temperature control device 3 and a pressure control device 4, the evaporation mixer 1 is provided with a natural gas inlet 5, a desalinated water inlet 6 and a mixed gas outlet 7. Inside the evaporation mixer 1 is provided with a plurality of inner pipes 8. Said temperature control device 3 and the pressure control device 4 both are located at one end near the mixed gas outlet 7, said heat source inlet of said heat source is connected at one end of the evaporation mixer 1 near the natural gas inlet 5, said heat source outlet 10 of the heat source is connected at one end of the evaporation mixer 1 near the mixed gas outlet 7, said heat source inlet is connected with a first flow rate adjusting valve 11, the first flow rate adjusting valve 11 and the temperature control device 3 are interconnected with electronic control, said natural gas inlet 5 is connected with a second flow rate adjusting valve 12, the second flow rate adjusting valve 12 and the pressure control device 4 are interconnected with electronic control; Said outside of the evaporation mixer 1 is provided with a liquid level control device 13. Said desalinated water inlet 6 is provided with a third flow rate adjusting valve 14, the third flow rate adjusting valve 14 and the liquid level control device 13 are interconnected with electronic control; said steam separator 2 is provided with a steam separating inlet 15 and a steam separating outlet 16. Inside said steam separator 2 is provided with a skimmer 17. In this embodiment, said temperature control device 3 is a temperature controller, said pressure control device 4 is a pressure adjusting valve, and said liquid level control device 13 is a level gauge.

The steam to carbon ratio control principle of the present invention is realized through controlling the partial pressure of the saturated steam and the total pressure of the mixed gas.

The saturated steam pressure, known as $P_S$, the mixed gas total pressure, known as $P_H$, and the natural gas pressure, known as $P_{NG}$, all three of which possess therebetween the below relationship:

$$P_H = P_S + P_{NG} \quad \text{Formula (1)}$$

i.e. $P_{NG} = P_H - P_S$ Formula (2)

Under a certain pressure, the saturated steam pressure and the temperature have a certain functional relationship. It can then be concluded that: when the temperature is constant, the saturated steam pressure is also constant.

As shown in FIG. 1, the evaporation mixer 1 has an external heat source (such heat source can be a saturated steam, process gas, intermediate air or reformed gas that possesses a certain temperature) entering a shell of the evaporation mixer 1. On the pipeline to the heat source inlet is provided with the first flow rate adjusting valve 11. Adjustment between the first flow rate adjusting valve 11 and the temperature control device 3 on a pipeline to the evaporation mixer 1 outlet is made through electronic control signals. If the temperature at the outlet of the device is relatively high, then the flow rate of the heat source at the inlet is reduced to lower the internal temperature of the device. Such response time is very short. Control on the internal temperature of the device means indirect control on the saturated steam pressure inside the device, i.e. $P_S$.

The lateral side of the evaporation mixer is provided with the liquid level control device 13. Adjustment between the liquid level control device 13 and the third flow rate adjusting valve 14 on a pipeline to the desalinated water inlet 6 is made through electronic control signals. When the liquid level is too high or too low, the desalinated water flow rate is adjusted to adjust the liquid level, resulting in that the desalinated water level within the inner pipe 8 in the device always remain at a certain amount.

The mixed gas outlet 7 of the evaporation mixer 1 is provided with the pressure control device 4. Connection between the pressure control device 4 and the second flow rate adjusting valve 12 on a pipeline to the natural gas inlet is made through remote electronic control signals. By adjusting the opening of the second flow rate adjusting valve 12, the intake amount of the natural gas can be adjusted to control the pressure at the outlet of the device at a certain value, said pressure is $P_H$.

According to Formula (2), it is known that $P_{NG}$ has a constant value. Also, according to Dalton's law of Partial Pressure, the ratio of the volumes of two substances equals to the ratio of their pressures. In conclusion, the steam to carbon ratio of the raw gases (and the ratio of volume of natural gas and volume of steam gas) can be effectively and accurately controlled.

As shown in FIG. 2, desalinated water enters the evaporation mixer 1 from the desalinated water inlet 6 at the bottom of the evaporation mixer 1. The natural gas enters the pipeline of the evaporation mixer 1 through the natural gas inlet 5 at the bottom of the evaporation mixer 1. Under the action of the bubbling to rise of natural gas in the inner pipe 8, the desalinated water in the inner pipe 8 rises in the form a film on the wall of the inner pipe 8, as shown by the arrows along the internal side of the inner pipe 8. The arrows along the external side of the inner pipe 8 show the flow direction of the heat source inside the shell of the evaporation mixer 1. Under the action of the external heat source inside the shell of the evaporation mixer 1 having a certain temperature, the desalinated water risen in the form of a film changes into saturated steam. The saturated steam and natural gas mix in the inner pipe 8 of the evaporator, leave from the mixed gas outlet 7 at the top of the evaporation mixer 1, and enter the steam separator 2 for separation of liquid desalinated water and parts of the impurities produced during the transportation process. Then, the mixed gas of saturated steam and natural gas with a certain steam to carbon ratio enters the next procedure.

The foregoing is only a preferred embodiment of the invention only and not intended to limit the invention, where the present invention within the spirit and principles, any changes made, equivalent replacement, improvement, etc., should be included in the present invention within the scope of protection.

What is claimed is:

1. A steam to carbon ratio control device, comprising: a heat source, and an evaporation mixer (1) and a steam separator (2) interconnected by pipelines, said connecting pipelines of the evaporation mixer (1) and the steam separator (2) are provided with a temperature control device (3) and a pressure control device (4), said evaporation mixer (1) is provided with a natural gas inlet (5), a desalinated water inlet (6) and a mixed gas outlet (7), said heat source inlet is connected with an end closer to the natural gas inlet (5) of the evaporation mixer (1), said heat source outlet (10) is connected to an end closer to the mixed gas outlet (7) of the evaporation mixer (1), said heat source inlet is connected with a first flow rate adjusting valve (11), said first flow rate adjusting valve (11) and the temperature control device (3) are connected with electronic control and adjustment between the first flow rate adjusting valve (11) and the temperature control device (3) is made through first electronic control signals, said natural gas inlet (5) is connected with a second flow rate adjusting valve (12), said second flow rate adjusting valve (12) and the pressure control device (4) are connected with electronic control and connection between the pressure control device (4) and the second flow rate adjusting valve (12) is made through remote electronic control signals; further comprising a skimmer (17) inside steam separator (2).

2. The steam to carbon ratio control device according to claim 1, further comprising:
    a liquid level control device (13) provided on the evaporation mixer (1); and
    a third flow rate adjusting valve (14) provided on the desalinated water inlet (6); wherein the liquid level control device (13) and the third flow rate adjusting valve (14) are interconnected with electronic control and adjustment between the liquid level control device (13) and the third flow rate adjusting valve (14) is made through second electronic control signals.

3. The steam to carbon ratio control device according to claim 2, wherein the liquid level control device (13) is provided on an outside of the evaporation mixer (1).

4. The steam to carbon ratio control device according to claim 3, further comprising a plurality of inner pipes (8) inside said evaporation mixer (1).

5. The steam to carbon ratio control device according to claim 4, further comprising a steam separating inlet (15) and a steam separating outlet (16) provided on said steam separator (2).

6. The steam to carbon ratio control device according to claim 1, wherein said temperature control device (3) is a temperature controller, and the pressure control device (4) is a pressure adjusting valve.

7. The steam to carbon ratio control device according to claim 6, wherein said liquid level control device (13) is a level gauge, and said pressure control device (4) is a liquidometer.

8. The steam to carbon ratio control device according to claim 6, wherein said temperature control device (3) and the pressure control device (4) both are located at one end near the mixed gas outlet (7).

9. The steam to carbon ratio control device according to claim 8, wherein said heat source is a saturated steam, process gas, intermediate air or reformed gas.

* * * * *